US007473352B2

(12) United States Patent
Sundeng

(10) Patent No.: US 7,473,352 B2
(45) Date of Patent: Jan. 6, 2009

(54) APPARATUS FOR DETECTING AND REMOVING MOISTURE AND CONTAMINANTS IN A FUEL STORAGE TANK

(75) Inventor: Arild Sundeng, Alexandria, MN (US)

(73) Assignee: Optic Fuel Clean Equipment, Inc., Fargo, ND (US)

( * ) Notice: Subject to any disclaimer, the term of this patent is extended or adjusted under 35 U.S.C. 154(b) by 643 days.

(21) Appl. No.: 11/105,792

(22) Filed: Apr. 14, 2005

(65) Prior Publication Data

US 2006/0231501 A1 Oct. 19, 2006

(51) Int. Cl.
*B01D 17/12* (2006.01)

(52) U.S. Cl. ...................... 210/85; 210/257.1; 210/258; 210/241; 210/DIG. 5; 15/246.5

(58) Field of Classification Search .............. 210/532.1, 210/167.31, 167.01, 172.1, 194, 196, 85, 210/94, 416.4, 258, 257.1, 799, 241, DIG. 5; 340/619; 15/246.5
See application file for complete search history.

(56) References Cited

U.S. PATENT DOCUMENTS

| | | | | |
|---|---|---|---|---|
| 2,647,639 | A * | 8/1953 | Grein | 210/232 |
| 4,296,723 | A * | 10/1981 | Aldrich | 123/510 |
| 5,333,639 | A * | 8/1994 | Nelson | 137/150 |
| 5,336,418 | A * | 8/1994 | Rawlins | 210/799 |
| 6,806,952 | B1 * | 10/2004 | Kois | 356/241.4 |
| 7,198,715 | B2 * | 4/2007 | Herges et al. | 210/180 |

* cited by examiner

*Primary Examiner*—Terry K Cecil
(74) *Attorney, Agent, or Firm*—Larkin Hoffman Daly & Lindgren Ltd.; Thomas J. Oppold

(57) ABSTRACT

An apparatus for detecting and removing moisture and contaminants from fuel stored in a tank includes optical fiber for examining the fuel for moisture and contaminants, a light source and a lens; a suction hose insertable into the tank; a pump connected to the suction hose, a waste holding container for receiving moisture and contaminants; a contaminant filter connected to the return hose; and a valve between the pump outlet, the waste holding container and the contaminant filter inlet.

8 Claims, 4 Drawing Sheets

APPARATUS FOR DETECTING AND REMOVING MOISTURE AND CONTAMINANTS IN A FUEL STORAGE TANK

BACKGROUND OF THE INVENTION

The present application relates to an apparatus and method for removing water and other contaminants from fuel, and particularly to the use of a fiber optic cable and lens for viewing the presence of such water and contaminants.

Operation and maintenance have quickly become the new buzzwords in regulatory circles. Ask any inspector about underground storage tank compliance issues and the inspector will quickly cite leak detection, cathodic protection testing, piping, sumps and under-dispenser boxes as primary concerns. Water has this nasty habit of getting into places where it does not belong. This includes sumps, dispenser boxes, basements and even tanks. Water can enter tanks by way of the infrastructure, which includes pipelines, barges or trucks. But it can also enter an underground storage tank (UST) or above ground storage tank (AST) by condensation, fill boxes or tank sumps. Of course, a tank at a retail service station is the last place an owner-operator wants to find water. That water needs to be removed before it gets sucked into a motor vehicle's fuel tank, which can lead to irate motorists.

A number of organizations have developed recommended practices and standards to monitor water in tanks and provide for its removal. Before the days of automatic electronic liquid sensing and inventory devices, some operators daily used a special paste on a gauge stick to determine if water had entered the tank. American Petroleum Institute included procedures within their recommended practices with the goal to minimize the water content and maximize fuel quality. See API 1621, "Bulk Liquid Stock Control at RetailStations," and API 2610, "Design, Construction, Operation, Maintenance, and Inspection of Terminal & Tank Facilities." Steel Tank Institute recommends that water be removed from steel storage tanks on a regular basis within their tank installation and maintenance practices. Petroleum Equipment Institute's RP 100-2000, "Recommended Practices for Installation of Underground Liquid Storage Systems," states, "Install tanks to facilitate water removal."

For example, a tank can be sloped so that water collects at one end for easier removal. By removing the water, the life of the fuel filter and other dispensing-system components will be extended. More importantly, the gas-buying customer is assured of a quality fuel product. The question of how to address water in UST and AST systems has taken on added urgency during the last two decades as America's quest for cleaner air has led to new fuel blends featuring oxygenates. California is the largest state to ban the oxygenate MTBE. Major oil companies in California have already begun using ethanol and taken the necessary steps with their UST systems to ensure a smooth transition. With the replacement of MTBE by ethanol throughout America likely to take place during the next few years, the need to keep water out of tanks is an even more important task than ever before, as ethanol blends are very sensitive to water. (See www.steeltank.com for more on ethanol-blended fuels.) The operation and maintenance issues reach critical mass when ethanol combines with water and microscopic matter. Various microorganisms are carried in air and water.

Tanks with poor housekeeping are likely to see a buildup of sludge in conjunction with the water. The sludge serves as a breeding ground as the microorganisms multiply and form a potentially hazardous microbial colony, regardless of the type of tank material storing the fuel. Filters can be clogged frequently, product flow to the vehicle slows down, and the quality of fuel diminishes when such microbes begin to feed and grow in the water layer trapped at the tank bottom. In the case of steel, the microbes, or bugs, can create a corrosive environment. In plastic tanks where a high alcohol content has led to phase separation at the tank bottom, the plastic is subject to softening and can experience a reduction in its strength properties.

There is a need for an improved apparatus and method to remove water and other contaminants from fuel in fuel storage tanks.

SUMMARY OF THE INVENTION

An apparatus for detecting and removing moisture and contaminants from fuel stored in a tank, the apparatus comprising:

(a) optical fiber for examining the fuel for moisture and contaminants, further comprising a light source and a lens;

(b) a suction hose insertable into the tank.

(c) a return hose insertable into the tank;

(d) a pump having an inlet connected to the suction hose, the pump also having an outlet;

(e) a waste holding container for receiving moisture and contaminants;

(f) a contaminant filter having an inlet and an outlet, the outlet connected to the return hose; and (g) a valve between the pump outlet, the waste holding container and the contaminant filter inlet.

A method for detecting and removing moisture and contaminants from fuel stored in a tank, comprising the steps of:

(a) optically inspecting fuel in the tank for moisture and contaminants;

(b) pumping fuel laden with moisture and contaminants into a measuring container until the measuring container is full;

(c) pumping the contents of the measuring container into a holding container;

(d) examining the fuel to determine whether the fuel is substantially clean of moisture and contaminants, returning to step (b) until the fuel is substantially clean of moisture and contaminants;

(e) pumping the fuel from the tank through a contaminant filter and then back into the tank until the fuel is free of moisture and contaminants; and (f) terminating pumping.

A principal object and advantage of the present invention is that moisture and contaminants in a fuel tank can be accurately detected at any location in the tank.

Another principal object and advantage of the present invention is that the amount of contaminated fuel removed can be accurately measured.

Another principal object and advantage of the present invention is that it is not necessary to remove all fuel from the tank in order to rid the fuel of moisture and contaminants.

DETAILED DESCRIPTION OF THE PREFERRED EMBODIMENT

Figure 1:
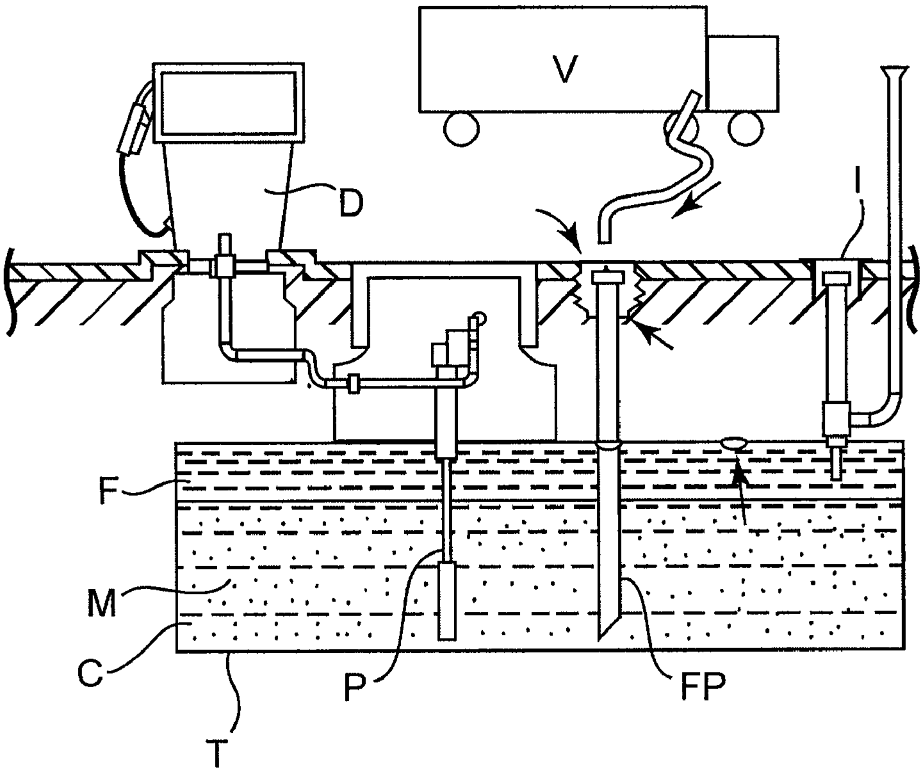
Fig. 1 (PRIOR ART)
FIG. 1 is a block diagram of the environment of the present invention.

The environment in which the present invention operates and to which the objects and advantages of the present invention apply is shown in FIG. 1. A fuel storage tank T may be either above ground or underground (an underground tank is shown in the Figure). The tank T has a pump P for pumping fuel out of the tank to a fuel dispenser D. A fill pipe FP is used to add fuel to the tank T, for example but not exclusively, from a vehicle V. An inspection port I allows access to the tank for inspection of the tank and its contents. Fuel F is stored in the tank T. Moisture M, such as liquid water, and other contaminants C may also be present in the tank. Typically, the fuel F will be on top of the moisture M because of the relative specific gravities. Contaminants C may either be in the moisture M or suspended in the fuel F.

The present invention is shown in the Figures as reference numeral 10.

Figure 2:
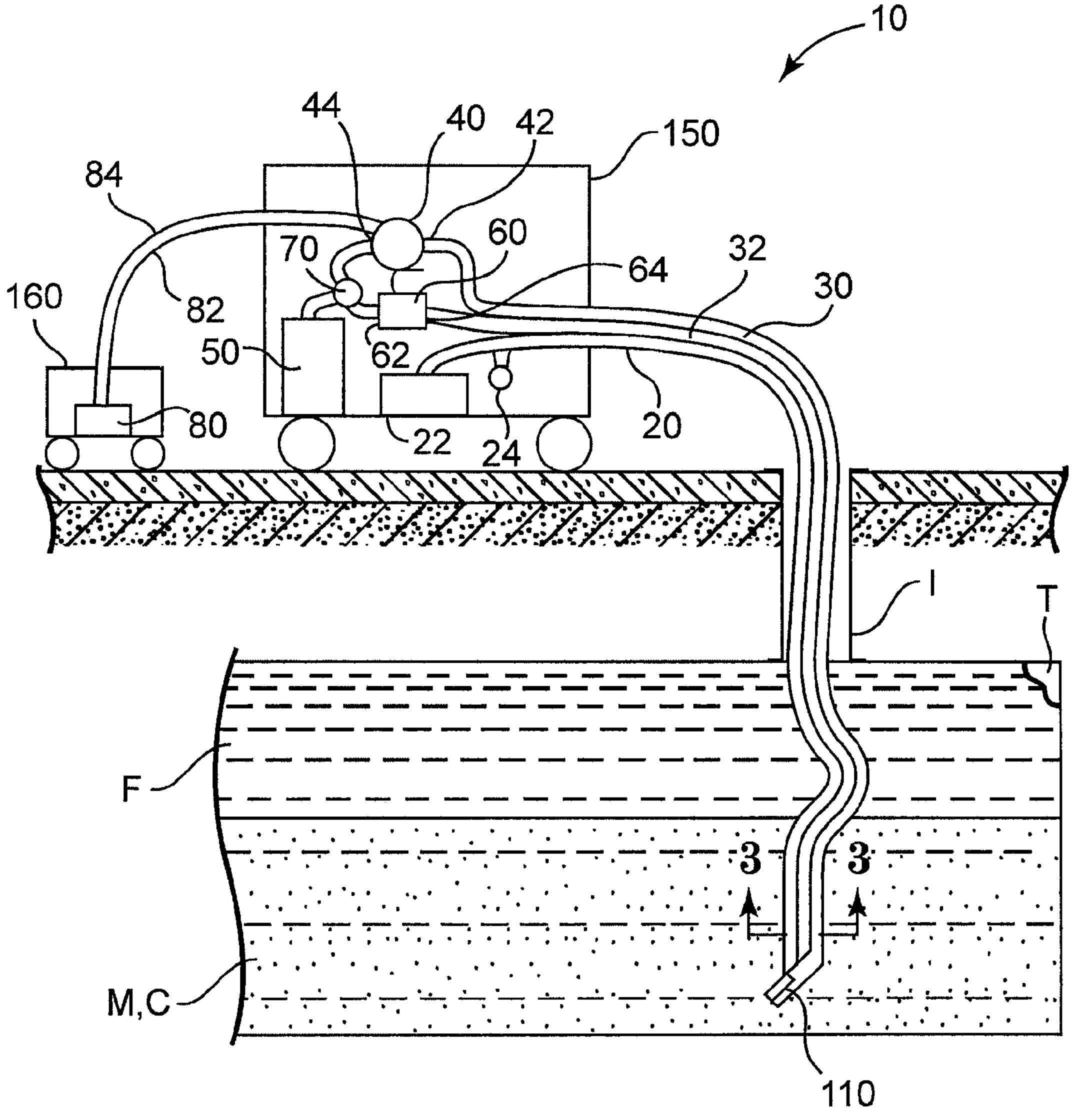
FIG. 2 is a block diagram of the present invention.

FIG. 2 is a block diagram of one aspect of the present invention at a high level. As shown in FIG. 2, the present invention is an apparatus 10 for detecting and removing moisture and contaminants from fuel stored in a tank, the apparatus 10 comprising an optical fiber 20 for examining the fuel for moisture and contaminants, a light source 22 connected to the optical fiber 20, and a lens 24 connected to the optical fiber 20. A suction hose 30 is insertable into the tank T, typically through the inspection port I. A return hose 32 is also insertable into the tank T. A pump 40 has an inlet 42 connected to the suction hose 30, and outlet 44. A waste holding container 50 receives moisture and contaminants from the tank T through the suction hose 30 and pump 40. A contaminant filter 60 having an inlet 62 and outlet 64 is connected to the return hose 32 at the outlet 64. A valve 70 connects the pump outlet 44 to either the waste holding container 50 or to the contaminant filter inlet 62.

Because of the presence of fuel vapors in the environment, the pump 40 cannot be electrically driven. Preferably, the pump 40 is driven by an air compressor 80. Suitably, the pump 40 may be a diaphragm or membrane pump. The air compressor 80 is connected to the pump 40 through air lines 82, 84.

Figure 3:
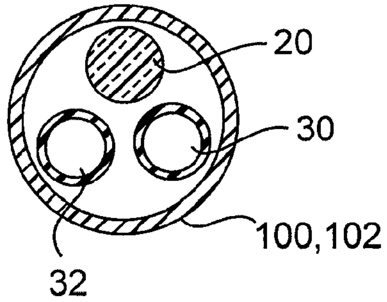
FIG. 3 is a schematic cross-section taken at approximately the lines 3 of FIG. 2.

Preferably, the suction hose 30, return hose 32, and optical fiber 20 are carried to the tank T as a unit, typically within a common carrier 100, a illustrated in FIG. 3. The common carrier may be a spring 102 enclosing the hoses 30, 32 and the fiber 20.

Preferably, the apparatus 10 further comprises a directional probe 110 attached to the optical fiber 20, to the suction hose 30, and to the return hose 32.

Figure 4:
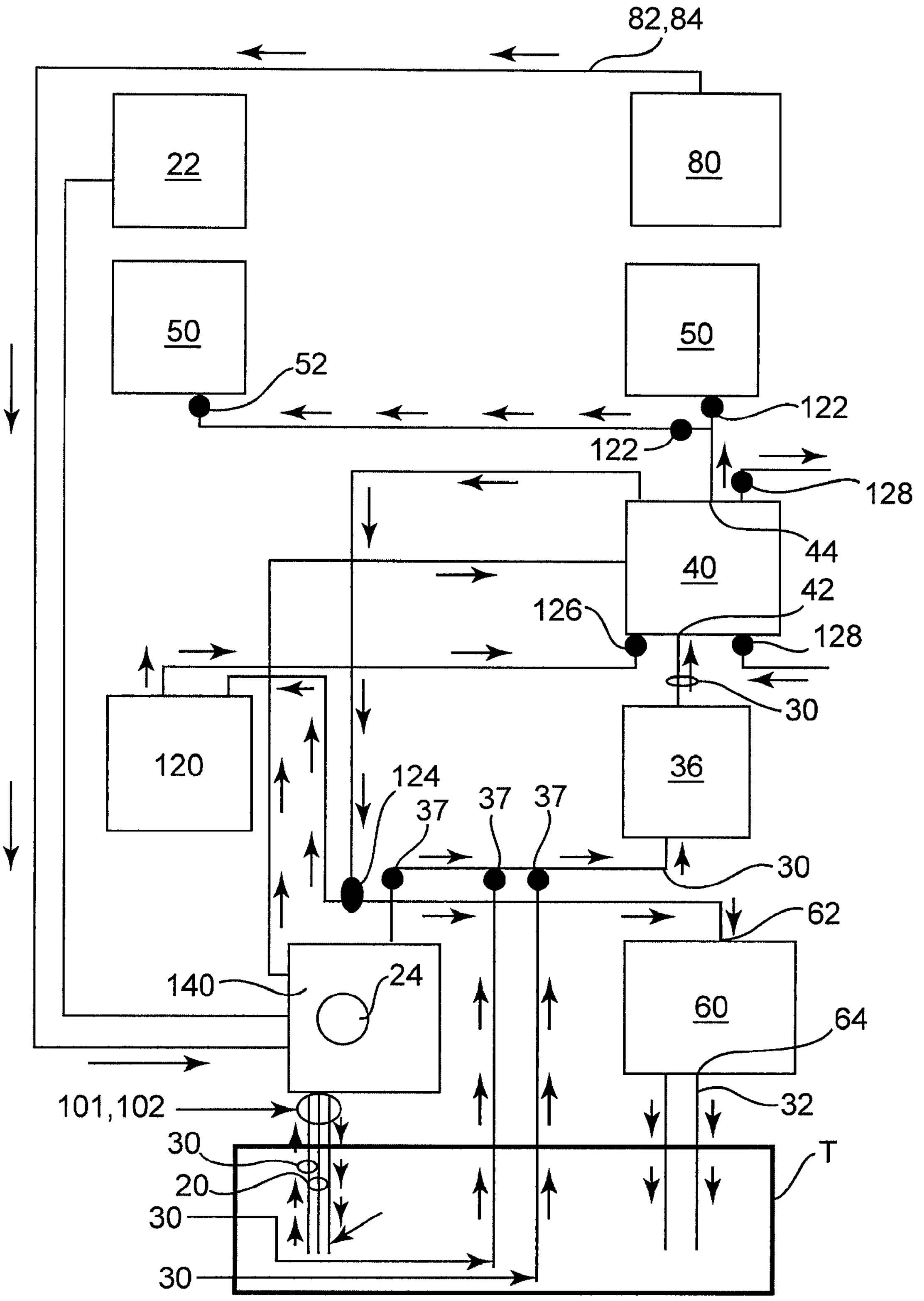
FIG. 4 is a block diagram of a second embodiment of the present invention.

FIG. 4 is a schematic of a second and preferred embodiment of the present invention.

The second embodiment is similar to the first embodiment with the addition of a waste measuring container 120 and appropriate valving. A shut-off valve 122 is placed between the pump outlet 44 and the waste holding container 50. A selector valve 124 is used to direct fluid from the pump outlet to either the waste measuring container 120 or to the contaminant filter inlet 62. Additional suction hoses 30 may be added as necessary to increase volume or to reach other portions of the tank. Additional valves 37 may be provided to choose which suction hose 30 is to be active. Additional waste containers 50 may also be added with suitable valves 52. A valve 126 may be placed between the waste measuring container 120 and the pump inlet 42 to allow fluid in the waste measuring container to be removed. Valves 128 may be added to connect the waste holding container 50 to the pump 40 and thus to pump the contents of the waste holding container 50 into a waste storage container (not shown). A panel 140 may be provided to house the lens 24 and various valves.

The apparatus 10 may be mounted on a vehicle 150 for transport. If necessary, the air compressor 80 may be mounted on a separate vehicle 160.

In either embodiment, a gravel filter 36 may be placed between the suction hose 30 and the pump inlet 42 to prevent gravel from the tank T entering the pump 40.

Detailed operation of the second embodiment will now be described. Operation of the first embodiment is simpler and may be easily understood without further description.

The tank inspection port I is opened. The directional probe 110 is inserted into the tank until it contacts the fuel F. The operator may rotate the directional probe 110 to view different parts of the tank using the lens 24, with the light source 22 illuminating the fuel. When moisture (typically liquid water) and/or contaminants (such as bacteria or rust) are encountered, the selector valve 124 is set to move liquid through the suction line 30, the pump 40, and the pump outlet 44 to the waste measuring container 120. Shut-off valve 122 is set to prevent liquid from flowing to the waste holding container 50. When the waste measuring container 120 fills to an operator-determined point, valves 126 and 122 are opened to pump the contents of the waste measuring container into the waste holding tank 50. When most of the moisture and contaminant has been removed from the fuel, the valve 124 is set to direct the output of the pump 40 to the contaminant filter 60, and filtered fuel is returned to the tank T. After a suitable time, the apparatus is shut down.

By the above operation, only the waste (water and contaminants) are removed from the tank, not good fuel.

Figure 5:
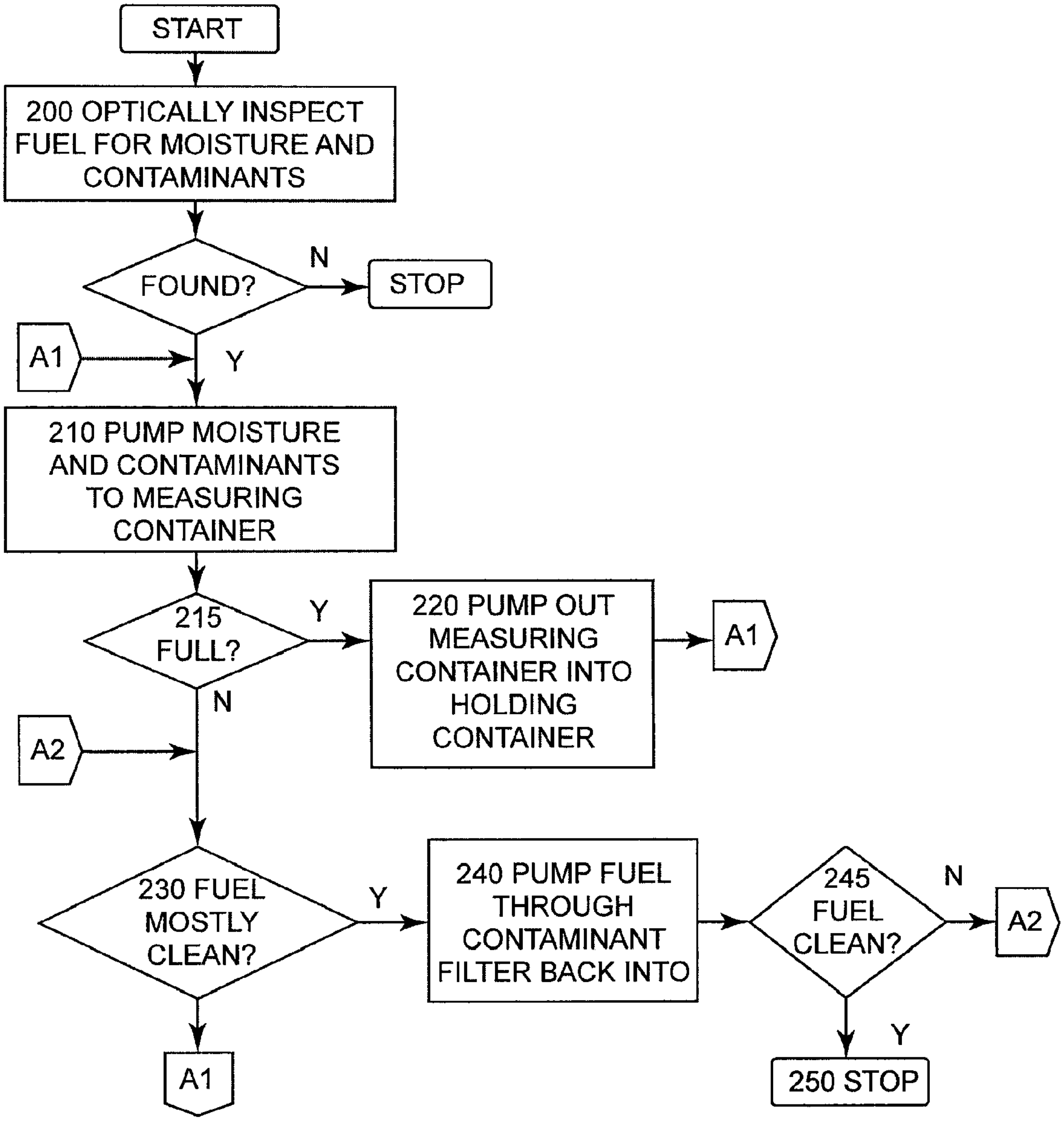
FIG. 5 is a flowchart of the present invention.

FIG. 5 is a flowchart of the method of the present invention.

In a second aspect, the invention is a method for detecting and removing moisture and contaminants from fuel stored in a tank, comprising the steps of:

200: Optically inspecting fuel in the tank for moisture and contaminants.

210, 215: Pumping moisture and contaminants into a measuring container until the measuring container is full.

220: Pumping the contents of the measuring container into a holding container.

230: Examining the fuel to determine whether the fuel is substantially clean of moisture and contaminants, returning to step 210 until the fuel is substantially clean of moisture and contaminants.

240, 245: Pumping the fuel from the tank through a contaminant filter and then back into the tank until the fuel is free of moisture and contaminants.

250: Terminating pumping.

Steps 230 and 245 may be performed in any manner that allows the fuel to be tested for the presence of moisture and contaminants. For example, the contents of the measuring container may be visually inspected. Alternatively, chemical testing may be performed on the fuel. The importance of the process is that it is not necessary to remove all fuel from the tank to remove the moisture and contaminants, but rather to remove only contaminated fuel.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. An apparatus carried on a movable support for detecting and removing moisture and contaminants from fuel stored in a tank, the apparatus comprising:

(a) optical fiber for examining the fuel for moisture and contaminants, further comprising a light source and a lens;

(b) a suction hose insertable into the tank;

(c) a return hose insertable into the tank;

(d) a pump having an inlet connected to the suction hose, the pump also having an outlet;

(e) a waste holding container in fluid communication with said pump outlet for receiving moisture and contaminants;

(f) a contaminant filter having an inlet and an outlet, the filter outlet connected to the return hose and the filter inlet in fluid communication with said pump outlet; and (g) a valve between the pump outlet, the waste holding container and the contaminant filter inlet, wherein said hoses and said optical fiber are enclosed within a common carrier for insertion into said tank as a unit.

2. The apparatus of claim 1, further comprising an air compressor driving the pump.

3. The apparatus of claim1, wherein the common carrier comprises a spring enclosing the suction hose, the return hose, and the optical fiber.

4. The apparatus of claim 1, further comprising a directional probe attached to the optical fiber, to the suction hose, and to the return hose.

5. The apparatus of claim 1, wherein said valve further comprises a shut-off valve between the pump outlet and the waste holding container and a selector valve directing fluid from the pump outlet to either a waste measuring container or the contaminant filter inlet.

6. The apparatus of claim 1, further comprising a gravel filter between the suction hose and the pump inlet.

7. The apparatus of claim 1, further comprising an outlet from the waste holding container to the pump and an outlet from the pump to a waste disposal container.

8. The apparatus of claim 1, wherein the apparatus is mounted on a vehicle for transport.

* * * * *